US006742750B2

(12) United States Patent
Burr

(10) Patent No.: US 6,742,750 B2
(45) Date of Patent: *Jun. 1, 2004

(54) ADJUSTABLE LEVELING MOUNT

(76) Inventor: William J. Burr, S & W Manufacturing Company, Inc., 400 S. Evergreen, Bensenville, IL (US) 60106

(*) Notice: Subject to any disclaimer, the term of this patent is extended or adjusted under 35 U.S.C. 154(b) by 0 days.

This patent is subject to a terminal disclaimer.

(21) Appl. No.: 10/352,821

(22) Filed: Jan. 28, 2003

(65) Prior Publication Data

US 2003/0146355 A1 Aug. 7, 2003

Related U.S. Application Data

(63) Continuation-in-part of application No. 09/975,906, filed on Oct. 12, 2001, now Pat. No. 6,520,459.

(51) Int. Cl.[7] ............................................. F16M 11/24
(52) U.S. Cl. ............................ 248/188.4; 248/188.2; 248/188.8
(58) Field of Search ....................... 248/188.4, 188.2, 248/188.8, 677

(56) References Cited

U.S. PATENT DOCUMENTS

| | | | | |
|---|---|---|---|---|
| 1,886,112 A | * | 11/1932 | Luarde | 248/188.4 |
| 2,327,050 A | * | 8/1943 | Kotler | 248/188.4 |
| 3,000,041 A | * | 9/1961 | Reynolds | 16/42 R |
| 3,815,852 A | * | 6/1974 | May | 248/569 |
| 3,845,924 A | * | 11/1974 | Taviere et al. | 248/544 |
| 4,015,808 A | * | 4/1977 | Carroll | 248/188.4 |
| 4,061,298 A | * | 12/1977 | Kober | 248/677 |
| 4,632,356 A | * | 12/1986 | Munz | 248/638 |
| 5,104,075 A | * | 4/1992 | Freeman | 248/188.4 |
| 5,148,892 A | * | 9/1992 | Lu | 182/201 |
| 5,632,689 A | * | 5/1997 | Duca | 473/279 |
| 5,782,444 A | * | 7/1998 | Anderman et al. | 248/188.8 |
| 5,794,912 A | | 8/1998 | Whittaker et al. | |
| 5,881,979 A | * | 3/1999 | Rozier et al. | 248/188.5 |
| 6,138,979 A | * | 10/2000 | Morman | 248/638 |
| 6,520,459 B2 | * | 2/2003 | Burr | 248/188.4 |
| 2001/0019096 A1 | * | 9/2001 | Andreoli et al. | 248/188.8 |

* cited by examiner

Primary Examiner—Leslie A. Braun
Assistant Examiner—A. Joseph Wujciak
(74) Attorney, Agent, or Firm—Leon I. Edelson; William C. Clarke; Levenfeld Pearlstein

(57) ABSTRACT

A leveling mount is disclosed for equipment in temporary or permanent installations wherein the supporting surface can be a non-level planar surface. A ball and socket support stud provides a self-leveling adjustment of support. An elastomeric removable mount base pad provides non-skid means. Limited swivel and radial movement of the ball and socket support stud are maintained. The leveling mount base can engage a support stud affixed to the supported equipment. A ball retaining agent provides a security lock against removal of the ball from the ball socket from sock or impact. The ball retaining agent alternatively is adjustable to limit range of swivel from 15° from the vertical and to lock limited swivel and rotary movements of the ball and socket stud into fixed positions.

11 Claims, 2 Drawing Sheets

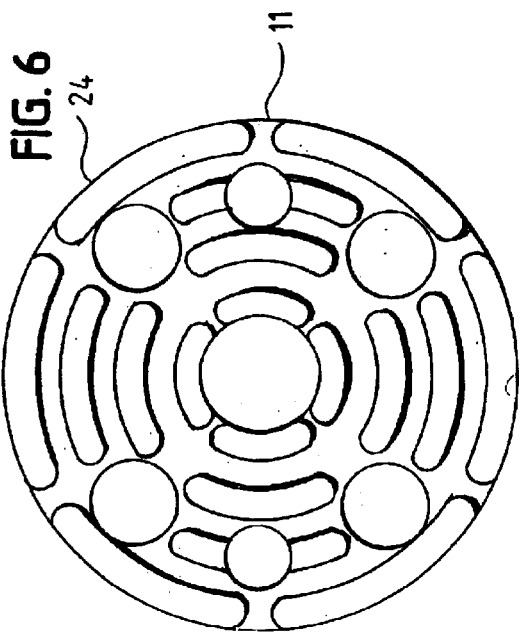
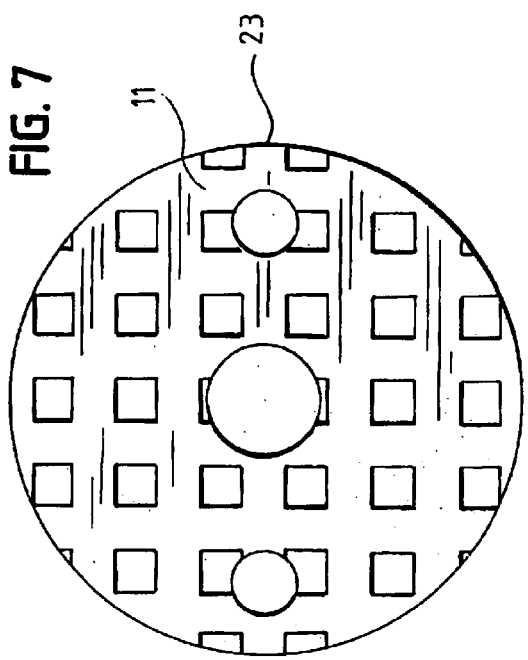
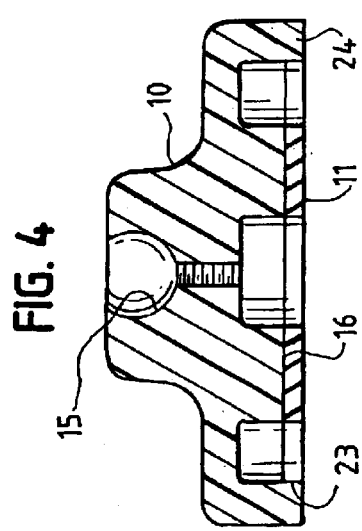
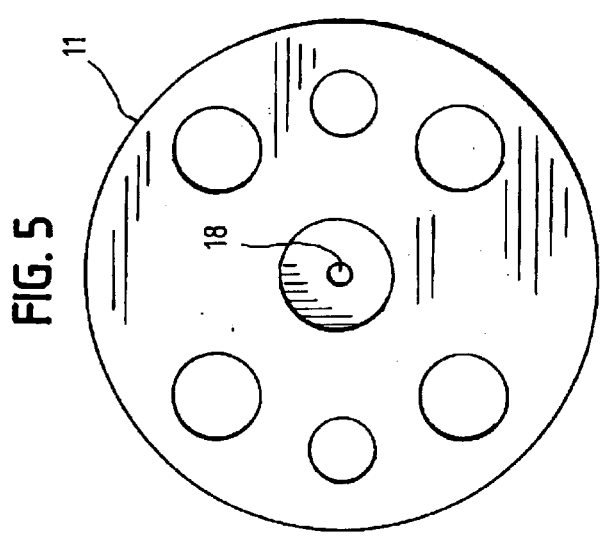

ADJUSTABLE LEVELING MOUNT

CROSS REFERENCE TO RELATED APPLICATIONS

This application is a continuation-in-part of Ser. No. 09/975,906 filed Oct. 12, 2001 now U.S. Pat. No. 6,520,459.

FIELD OF THE INVENTION

The field of this invention relates to equipment leveling devices. The present invention is a device to permit installation of equipment in temporary or permanent locations wherein the supporting surface may not be a level planar surface. Leveling elements are accordingly required to supply adjustable support for the equipment to overcome the uneven support surface in order for the equipment to be leveled despite the non-planar support surface. The present invention is also adapted to permit the equipment to be repositioned or moved to uneven surfaces without loss of stability upon an uneven or non-level surface in non-skid applications.

The term "non-skid" refers to the substantial anchoring of equipment in a specific location upon what can be described as a non-planar surface so that the equipment does not move from its designated position during operation despite vibratory or oscillatory movement of the equipment. The present invention accordingly is a unique leveling mount to be installed on a wide variety of operating equipment including machine tools, packaging and printing machines and other machines performing a wide range of operations.

BACKGROUND OF THE INVENTION

Many types of leveling devices utilize a simple screw-jack consisting of a bolt that provides a means of raising or lowering the device, the bolt threaded directly into the leveling mount. The use of a bolt as a load bearing leg for the support of machinery can pose difficulties if the machine is to be placed upon a surface that tilts or requires the machine be in a fixed position perpendicular to the support surface. The tilt of the supporting bolt can cause a resulting stress upon the bolt, which results in the failure of the bolt. U.S. Pat. No. 5,104,075 to Freeman discloses a machine leveling assembly, which employs a screw-jack machanism with a ball and socket support and load transmission member comprising a threaded metal shaft mounted vertically in a leveling assembly. The shaft terminates in a ball, which is inserted into a separate ground support base configured to allow the ball to rotate freely and allow the load to be distributed more evenly about the spherical surface of the socket.

The use of a threaded screw or spindle to adjust the vertical support of a mounting device in conjunction with motion resistant and shock-absorbing members is taught in prior art. U.S. Pat. No. 3,815,852 to May discloses a machine mount device, which has a special friction surface for resting upon a floor to resist lateral motion displacement. The friction surface consists of a metal layer to which is brazed a quantity of carbide grits so that with motion of the machine mount, the grits tend to work into the floor surface to hold the supported machine in a fixed position. The vertical machine support, a threaded leveling bolt, is threaded through a lock nut to retain the machine support in place to support the machine. U.S. Pat. No. 4,632,356 to Munz discloses a mounting device comprising a foundation body of a resilient material of rubber or other suitable elastomer with a metal cover plate into which is rotated a threaded spindle to adjust the vertical support of the supported object. A retaining ledge on the supported object holds the supported object against rotation during rotation of the threaded spindle. In one embodiment, a threaded bolt of the support plate is screwed into an intnernal thread of a double spindle with a threaded bushing. U.S. Pat. No. 5,794,912 to Whittaker discloses a vibration isolation mount comprising an elastomeric material within an enclosing metal frame. An adjustable threaded screw through the metal frame rests upon a steel plate inserted into a recess within the elastomeric material and thus can raise and lower heavy equipment support surface. The elastomeric material is configured so the elastomeric material contacts the support surface thus dampening and isolating horizontal vibrations imposed on the mount from the supported equipment.

It thus is well known to use a threaded support to raise and lower a supported object as a mounting device and leveling agent. However, objectionable aspects of devices ordinarily available as equipment leveling devices can restrict the utility of such devices and may create problems in their application and use. A disadvantage of the mounting device taught by Freeman '075 is that the ball and socket arrangement is not self-leveling. While the arrangement permits the load to be evenly distributed about the spherical surface of the socket, the ball is not free to move from the vertical to adjust for unevenness of the supporting surface during installation of the machine-leveling device. The Freeman '075 machine-leveling device also utilizes the practice of insertng load-bearing shims precision ground to fit. As Freeman '075 teaches, shims can be difficult to use if the machine is to be placed on a surface that varies in elevation between different mount locations. The May '852 patent discloses a vertical supporting element on a base with carbide grits which frictionally engage and cut into softer floor materials and work into the floor. The machine mount apparatus of the May '852 patent and the supported machine are not free to be easily moved after engagement with the supporting floor. The Munz '356 patent requires that the particular object to be supported must be provided with engaging surfaces which in conjunction with a protruding ledge of the mount device engages and retains the object in position against rotation of the mounting device support upon rotation of a threaded spindle to adjust the spacing between the object and the supporting surface. Moreover, the Munz patent indicates that deviations from vertical alignment require compensating adjustments in the design of the mounting device to provide an adjustable mounting device for the required application instead of being initially a self-leveling mounting device. The Whittaker patent '912 discloses an elastomeric material within a metal frame, which contacts a supporting surface such as a floor or other structure. Function of the elastomeric material is as a vibration isolation mass and a support for heavy-duty dynamic equipment such as stamping presses, machine tools and the like. The elastomeric materal is taught as having a flat lower surface in contact with the supporting surface and is inserted within the metal frame. The elastomeric material insert is shaped and dimensioned to fit snugly within the metal frame in that the sides of the frame engage the sides of the elastomeric insert. The weight of the supported equipment maintains the positioning of the insert within the frame. No provision by Whitaker '912 is provided for easy replacement for the elastomeric insert if such is required by usage or for self-leveling of the mounting device.

Accordingly, it is an object of the instant invention to provide a leveling mount, which provides a self-leveling ball and socket arrangement and self-leveling means of supporting a structure wherein the support surface may not be a level planar surface.

Another object of the instant invention is to provide a leveling mount which provides a self-leveling ball and socket arrangement and a self-leveling means of supporting a structure wherein the support surface may not be a level planar surface wherein the ball is securely locked into its socket by a ball retaining agent removably inserted through the base of the leveling mount to lock the ball in the ball socket while still allowing rotational and swiveling action of the ball.

Another object of the instant invention is to provide an adjustable leveling mount comprising a ball and socket joint with an adjustable ball retaining agent to prevent the ball from being released from the socket when subjected to high pullout forces while permitting a full range of rotary motion and swivel motion from the vertical but is adjustable to limit ranges of rotary and swivel motions.

Another object of the invention is to provide an equipment mount assembly in which the vertical support elements are effectively combined with an elastomeric non-skid base pad to provide efficient mounting of equipment and to restrict appreciable displacement along the surface of the support surface and damage to the support surface.

A further object of the invention is to provide an efficient means of replacing or resurfacing the elastomeric non-skid base pad by providing a removable male circumferential resurfaceable locking elastomeric pad which locks in place inside the perimeter of the base mount and over female circumferential indentations between multiple perimeter projecting support studs or feet on the base mount with removability, and resurfacing replacement after wear or damage.

A still further object is to permit engineering of the elastomeric base pad to required needs of the installation, to modify the thickness, size, and material of the base pad as needed to provide a larger base pad to reduce vibration effects upon the mounted equipment or support surface or to overcome environmental conditions.

An additional object is to provide an equipment mount assembly with design flexibility comprising a threaded ball socket suitable for receiving a threaded insert or a threaded fixed stud on equipment, wherein the leveling mount needs to be easily removed, a larger than standard stud can be attached to or mounted in the leveling mount base or the mounted equipment already has a fixed stud which needs to be inserted in the leveling mount base.

BRIEF SUMMARY OF THE INVENTION

This invention relates to an adjustable leveling mount for installation of equipment in locations wherein the supporting surface may not be a level planar surface. The invention comprises a ball and socket arrangement and self-leveling mount which adjusted to uneven surfaces without operative adjustments, a non-skid elastomeric base pad to restrict the movement of the equipment from its designated position during operation despite vibratory or oscillatory movement of the equipment and a ball lock comprising a ball retaining agent removably inserted through the leveling mount base which alternatively locks the ball of the leveling mount in the ball socket and alternatively allows control of rotational and swivel action of the ball. The non-skid elastomeric base pad utilizes male-female design elements and allows replacement or resurfacing upon damage, wear, or installation requirements. The non-skid elastomeric base pad permits the equipment to be temporarily repositioned or moved to uneven surfaces without damage to the support surface. The mount alternatively comprises a threaded ball socket suitable for receiving a separately sized ball end stud, or a threaded equipment stud, said separately sized ball end stud or threaded equipment stud being integral supports of supported equipment.

BRIEF DESCRIPTION OF THE DRAWINGS

FIG. 4 is a view of the leveling mount base showing the female indentations of the base for receiving the male projections of the non-skid elastomeric base pad and the base pad fits in place inside the perimeter of the leveling mount base between the multiple support studs.

FIG. 5 is an up view of a non-skid elastomeric base pad fastened to the base mount by means of screws.

FIG. 6 is a bottom view of the non-skid elastomeric base pad fastened by means of screws.

FIG. 7 is a top view of the base mount with the ball end socket and support frame members nut.

Figure 1:
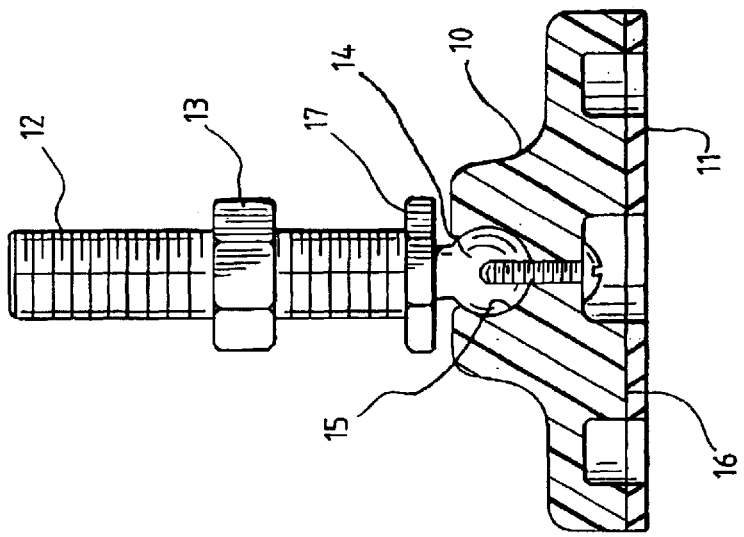
FIG. 1 is a cross-sectional view of the socket lock non-skid leveling mount with a threaded support stud and the ball retaining agent to lock the ball in the ball socket of the present invention.

Upon inspection of FIG. 1 it will be noted that the leveling mount comprises plastic base mount 10, a non-skid elastomeric base pad 11, a threaded stud 12 with a jam nut 13 and a ball ended support member 14, an indented socket 15 in plastic base mount 10, a female circumferential indentation 16 in plastic base mount 10 to mount elastomeric base pad 11. Threaded stud 12 has a milled hexangular-projecting block 17 to alow threaded stud 12 to be screwed or turned into a required position.

Figure 3:
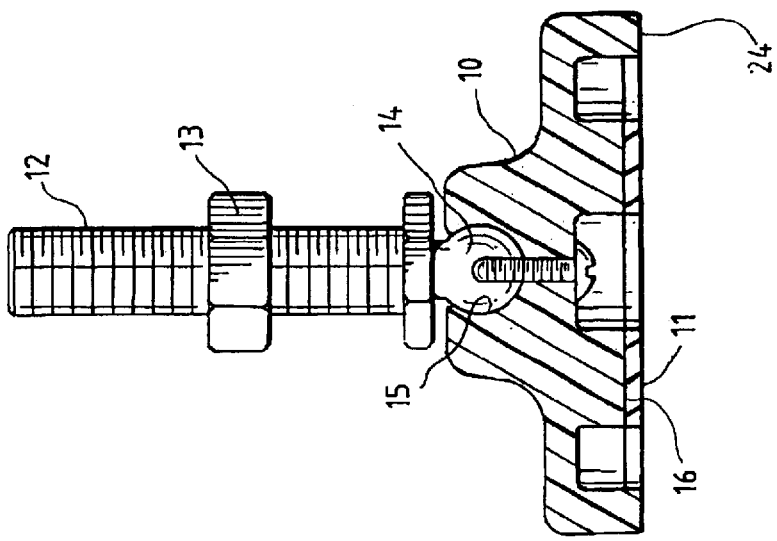
FIG. 3 is an alternate view of the leveling mount base wherein the base pad fits in place inside the perimeter of the leveling mount base.
Figure 2:
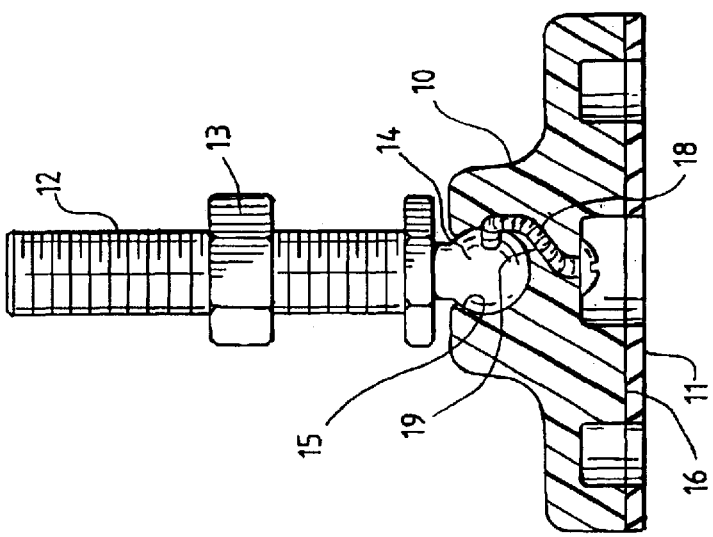
FIG. 2 is a cross-sectional view of an alternative view of the socket lock non-skid leveling mount with a tapped socket suitable for receiving a separately sized ball end stud or a equipment stud which are integral supports of supported equipment.

In FIG. 2, the plastic base mount 10 has an internal based chamber 18 to provide means of insertion of an external security lock agent 19 to securely lock the inserted ball end 14 in indented socket 15 wherein indented socket 15 is sized to allow a restricted movement of the inserted ball-ended support member to about 150 from the vertical and 360° rotary movement of the leveling mount base. A cross sectional view of base mount 10, indentation 16 and elastomeric base pad 11 is also shown. FIG. 3 is a perspective view of the leveling mount base of FIG. 1 wherein three raised tabs are shown on the plastic base mount 10 base bottom to provide three point support contact of the base mount. FIG. 4 is a cross-sectional view of the leveling mount of FIG. 1, wherein the base pad 11 fits in place inside the perimeter 23 of the leveling mount base and the perimeter chamber of the leveling mount base to spread the load. FIG. 5 is an up view of the elastomeric base pad 11 showing the bored chamber 18 and the security lock agent 19 and male circumferential projection 24 which engages the female circumferential indentation 23 of the plastic base mount 10 of FIG. 1 or plastic base mount 10 of FIG. 2.

FIG. 6 is an up view of the elastomeric base pad showing the male circumferential projection 24. FIG. 7 is an up view of the base pad suitable for adhesive attachment of the base pad to the base mount.

DETAILED DESCRIPTION

The present invention relates to a unique adjustable leveling mount to be installed on equipment to support and level equipment on an uneven or non-level surface utilizing a ball and socket arrangement. The leveling mount is used to support and level a wide variety of equipment including machine tools, electronic equipment, packaging and printing machines. The mount is constructed of a suitable plastic material with a non-skid cup pad of elastomeric material. The leveling mount engages the mounting stud so that the mounting stud can freely swivel 15° from the vertical to all sides of the centerline through a circular 360° movement in a ball socket. The mounting stud is a threaded metal bar of carbon steel or alloy steel with a ball end whch swivels in the leveling mount. Alternatively, a fixed stud already attached to the supported equipment can be engaged with the ball socket of the leveling mount. The ball and socket arrangement allows for a self-leveling adjustment of the leveling mount on an uneven or non-level surface. The ball and socket combination also allows the load to be more evenly distributed about the entire spherical surface of the socket.

The leveling mount utilizes a ball and socket arrangement in combination with an elastomeric base pad to obtain greater stability and location security despite vibratory or oscillatory movement of the equipment during operation, thus providing an added, non-skid attribute to the leveling mount. The term "non-skid" refers to the substantial anchoring of equipment in a specific location upon what can be described as a non-planar surface so that the equipment does not move from its designated position during operation.

The non-skid elastomeric base pad, alternatively termed a snap-in-place adhesive or screwed-on elastomeric cup pad is of any suitable elastomeric material including nylon, neoprene rubber, butyl rubber, polyurethane rubber, silicone rubber, natural rubber, and any synthetic elastomer suitable for the environmental requirements with resiliency and elasticity. The elastomeric material can be glass-reinforced to aid strength and shock resistance. The base pad is designed to be mounted on the leveling mount plastic base as a female and a male fitting or cupping pad upon the female and male designed leveling mount base wherein male circumferential projections of the base pad snap-in place over female and male circumferential indentations in the leveling mount base. The elastomeric feature of the material of the base pad permits the base pad to snap in place upon the leveling mount base and to be removed therefrom. Replacement of the elastomeric base pad is easily obtained by use of simple tools such as by inserting a flat blade between the adhesive surfaces of the support base mount and the base pad or of removing the holding screws. The designed base pad with the female and male fitting or cupping pad overcomes the difficulties inherent in any method of placement of the elastomeric base pad upon the leveling mount base. This method of attachment utilizes the elastomer characteristics of resiliency and elasticity to obtain a tight secure fit of the female and male elastomeric cup pad upon the female and male indented base of the leveling mount. The electrical insulation characteristics of the elastomer cup pad permit electrical insulation of equipment mounted on the leveling mount if such is needed or desired. The snap-in-place design of the elastomer cup pad permits engineering of the cup pad dimensions to the required needs of the security lock installation. The thickness and size of the cup pad can be modified for larger base mount surfaces and thickness to reduce vibration effects upon the mounted equipment. The snap-in-place adhesive can be a pressure-sensitive adhesive or any suitable replacement adhesive for the elastomer cup pad.

The female and male plastic base of the leveling mount is designed to accept the female and male elastomer cup pad as a female and male receiver and support base in that the female and male base elements of the plastic leveling mount are suitably indented to provide female and male circumferential indentations to receive the female and male circumferential locking projections of the snap-in-place elastomeric cup pad. The female and male plastic mount is sufficiently holed to form a receiving socket for the ball end of a stud, the said stud being the ball end of a threaded stud or the end of a fixed stud affixed to the mounted equipment. The receiving socket is sufficiently holed to allow the threaded stud with a ball end to swivel 15° from the vertical through 360° in a circular motion. The 15 degrees of movement provided by the receiving socket to the tapped ball stud provides increased stability in that range of deviation from the vertical is restricted but allows sufficient deviation to allow installation of supported equipment upon uneven surfaces that are non-level up to about 15 degrees deviation.

The threaded stud with a ball end is machined from a hardened solid bar of carbon or alloy steel and has a threaded jam nut to raise and lower the height and level of the supported equipment.

The leveling mount base comprises a ball retaining agent 19 which operates to lock the ball end of the inserted stud in the base mount receiving socket. The ball retaining agent comprises an inserted stud of suitable material of metal or plastic, to restrict removal of the ball end from the indented socket of the base. The ball retaining agent is removably inserted from the base mount and has a rounded head to retain the agent in place. The placement of the agent 19 from the bottom of the base mount extends upward to the ball end of the inserted stud to restrict removal of the ball end.

The ball retaining agent prevents the ball inserted stud or tapped ball from being released from the leveling mount base socket when subjected to high pullout forces which can occur during transport or sudden application of external force such as an impact. The ball retaining agent alternatively is adjustable to limit range of swivel from the 15° range of movement from the vertical to a fixed specific amount of swivel from the vertical to a zero range of swivel and to limit range of rotary motion from 360° to a lesser amount.

The leveling mount base has a ball socket formed therein of a suitable plastic material. The socket alternatively is suitably sized to receive either a threaded stud with a ball end or to receive a support stud affixed to the supported equipment. The leveling mount base circumferential indented channel in conjunction with the circumferential base extension provides the female and male mounting for the elastomeric base pad.

The web structure of the leveling mount base provides support to the supported load by transforming the weight of the load to the support surface. The load impressed upon the ball socket has support directly under the ball socket to transmit the force of the supported load directly to the support surface. The perimeter of the leveling mount base has three leveling tabs to provide three point contact surface for the leveling mount to counter the effect of an uneven support surface. The ASTM test method A-370 for compression testing under 10,000 lbs has passed the leveling mount base in compression laboratory testing.

The instant invention accordingly comprises, in combination, a leveling mount base with (a) an indented socket, circumferential female and male circumember indented chambers extending around said leveling mount base the female circumferential indented chamber forming an element of said base mount for easy placement of said base pad upon its leveling mount base, the circumferential chambered footing male projection forming an element of said base mount for easy placement of said base pad upon the leveling mount base, and within the indented leveling mount base channel, said indented socket sized to receive an inserted support member for a supported structure, said indented socket sized to permit rotary movement and restrict movement from the vertical of said inserted support member, said circumferential female indented channel and circumferential male chambered footing projection forming a female and male engagement mounting, (b) a ball-ended support member comprising a ball-ended support stud to form a ball and socket joint with said leveling mount base with rotary movement and restricted movement from the vertical, (c) an elastomeric circumferential leveling mount base pad with resiliency and elasticity sized to fit tightly and securely on said leveling mount base as a female and male mounting engaging said leveling mount base with a circumferential female indented and male projecting engagements sized to seat said female circumferential indented channel and male projected projections of said leveling mount base.

The support stud with a ball end accordingly forms a ball and socket joint with the leveling mount base indented socket. The support stud, alternatively, can be affixed to a supported structure as a supporting part thereof. In such case, a ball end is not required of the equipment support stud. The elastomeric circumferential leveling mount base pad can be of any elastomeric material such as nylon neoprene rubber, butyl rubber, polyurethane rubber, silicon rubber, natural rubber, and any synthetic rubber. The elastomeric material can be glass reinforced to aid strength and shock resistance. The indented socket is sized to allow the inserted ball-ended stud movement of 15° from the vertical and a 360° rotary movement of the leveling mount base. The ball-ended support stud is threaded to receive a threaded nut to raise and lower the supported structure. The leveling mount base pad of elastomeric material can be snapped in place upon the base mount base with easy placement upon the base mount with snap-in-place pressure sensitive adhesive or with placement of holdng screws and is removable by inserting a flat blade between the adhesive surfaces or by removing the holding screws. Alternatively, the indented socket of said leveling mount base can be threaded to receive a threaded or non-threaded support stud without a ball end affixed to the supported structure.

What is claimed is:

1. A leveling mount comprising in combination:
   a. a leveling mount base with an indented socket, a circumferential indented female channel extending around said leveling mount base, a circumferential projecting male chambered footing projection forming an element of said circumferential indented female channel, said indented socket sized to receive an inserted support member for a supported structure as a means to permit rotary movement and restrict movement from the vertical of said inserted support member, wherein said indented socket is sized to allow a restricted movement of an inserted ball-ended support member to about 15° from the vertical and 360° rotary movement of the leveling mount base, said circumferential indented female channel and circumferential projecting male chambered footing projection forming a female and male engagement mounting;
   b. a support member element comprising a support stud sized to be inserted into said indented socket of said leveling mount base element to form a joint with rotary movement and restricted movement from the vertical;
   c. an elastomeric circumferential leveling mount base pad with resiliency and elasticity sized to fit tightly and securely on said leveling mount base element female and male mounting and engaging said leveling mount base with a circumferential female indentation and male projecting engagement lip sized to seat said elastomeric circumferential leveling mount base pad in said circumferential indented channel and said circumferential male projecting engagement lip of said leveling mount base;
   d. an ball retaining agent security lock comprising an inserted stud from an indented socket of the leveling mount base.

2. The leveling mount of claim 1 wherein said support member comprises a ball-ended support stud to form a ball and socket joint with the leveling mount indented socket.

3. The leveling mount of claim 1 wherein said support socket stud comprises a support stud affixed to said supported structure.

4. The leveling mount of claim 1 wherein said elastomeric leveling mount base pad is of a material selected from the group consisting of nylon, neoprene rubber, butyl rubber, polyurethane rubber, silicone rubber, natural rubber and any synthetic elastomer with resiliency and elasticity.

5. The elastomeric leveling mount base pad of claim 4 wherein said elastomeric base pad material is glass reinforced to aid strength and shock resistance.

6. The leveling mount of claim 1 wherein said support member element comprises a ball ended support stud threaded to receive a threaded nut to raise and lower the supported structure.

7. The leveling mount of claim 1 wherein said elastomeric leveling mount base pad is a snap-in-place pad for easy placement upon said base mount, is held in place by suitable means and is removable.

8. A leveling mount comprising, in combination:
   a. a leveling mount base element with an indented socket, a circumferential indented female channel extending around said leveling mount base, a circumferential projecting male chambered footing projection forming an element of said circumferential indented female channel, said indented socket sized to receive an inserted support member for a supported structure as a means to permit rotary movement and restrict movement from the vertical of said inserted support member, wherein said indented socket is sized to receive an inserted support member for a supported structure as a means to permit rotary movement and restrict movement from the vertical of said inserted support member, wherein said inserted support member in said indented socket of said leveling mount base is threaded, said circumferential indented female channel and said circumferential projecture, male chambered footing projection forming a female and male engagement mounting;
   b. a support member comprising a support stud sized to be inserted into said indented socket of said leveling mount base element to form a joint with rotary movement and restricted movement from the vertical;
   c. an elastomeric circumferential leveling mount base pad with resiliency and elasticity to snap-in-place on said base mount for easy placement upon said base mount, is held in place by suitable means and is removable;

d. a leveling mount base with a ball retaining agent security lock comprising an inserted stud from an indented socket of said leveling mount base.

9. The leveling mount base of claim 1 wherein said support stud comprises a fixed stud of supported equipment.

10. A leveling mount comprising, in combination:
a. a leveling mount base with an indented socket, a circumferential indented female channel extending around said leveling mount base, a circumferential projecting male chambered footing projection forming an element of said circumferential indented channel, said indented socket sized to receive an indented support member for a supported structure as a means to permit rotary movement and restrict movement from the vertical of said support member, wherein said indented socket is sized to allow a restricted movement of an inserted ball-ended support member to about 15° from the vertical and 360° rotary movement of the leveling mount base, wherein said circumferential indented female channel and circumferential projecting male chambered footing projection forming a female and male engagement mounting;
b. a support member element comprising a support stud sized to be inserted into said indented socket of said leveling mount element to form a joint with rotary movement and restricted movement from the vertical;
c. an elastomeric circumferential leveling mount base pad with resiliency and elasticity sized to snap-in-place on said base mount for easy placement upon said base mount, is held in place by suitable means and is removable by use of simple tools;
d. a leveling mount base with a ball retaining agent security lock comprising an inserted stud from an indented socket of said leveling mount base.

11. A leveling mount comprising, in combination:
a. a leveling mount base with an indented socket, a circumferential indented female channel extending around said leveling mount base, a circumferential projecting male chambered footing projection forming an element of said circumferential indented female channel, said indented socket sized to receive an inserted support member for a supported structure as a means to permit rotary movement and restrict movement from the vertical of said inserted support member wherein indented socket is sized to receive said circumferential indented channel and circumferential chambered footing projection forming a female engagement mounting, an inserted support structure as a means to permit rotary movement and restrict movement from the vertical of said inserted support member, wherein said circumferential indented female channel and circumferential projecting male chambered footing projection forming a female and male engagement mounting;
b. a support member element comprising a support stud sized to be inserted into said indented socket of said leveling mount base element to form a joint with rotary movement and restricted movement from the vertical;
c. an elastomeric circumferential leveling mount base pad with resiliency and elasticity to snap-in place on said leveling mount base element, a female engagement mounting and engaging said leveling mount base with a circumferential male projecting engagement lip sized to seat in said circumferential indented channel of said leveling mount base;
d. wherein said means to support said equipment comprises a fixed stud of said supported equipment.

* * * * *